United States Patent [19]

Ford et al.

[11] Patent Number: 4,816,939

[45] Date of Patent: Mar. 28, 1989

[54] MAGNETIC RECORDING MEDIA AND SERVO SYSTEMS USING LIGHT-TRANSMITTING OPTICAL GRATINGS

[75] Inventors: Vernon E. Ford, So. Hanover; Jeremy K. Jones, Marblehead; John J. Mader, Tewksbury; William T. Plummer, Concord, all of Mass.

[73] Assignee: Polaroid Corporation, Cambridge, Mass.

[21] Appl. No.: 898,527

[22] Filed: Aug. 21, 1986

[51] Int. Cl.$^4$ ............................................... G11B 5/596
[52] U.S. Cl. ................................. 360/77.03; 360/78.11
[58] Field of Search ......................... 360/77, 78, 135; 369/44 (U.S. only), 275 (U.S. only)

[56] References Cited

U.S. PATENT DOCUMENTS

| 2,092,892 | 12/1935 | Runge | 369/112 |
|---|---|---|---|
| 3,633,038 | 5/1974 | Falk . | |
| 4,542,989 | 9/1985 | Remijan | 356/356 |

FOREIGN PATENT DOCUMENTS

| 2315142 | 12/1977 | France . |
| 59-146444 | 1/1984 | Japan . |
| 60-263343 | 3/1985 | Japan . |
| 60-263342 | 7/1985 | Japan . |
| 8502933 | 7/1983 | PCT Int'l Appl. . |

OTHER PUBLICATIONS

IBM Technical Disclosure Bulletin, vol. 16, No. 9, Feb. 1974, p. 3020, Optical Servo Technique Using Moire Fringes, Hart.
IBM Technical Disclosure Bulletin, vol. 25, No. 12, May 1983, pp. 6432-6433, Monolithic Optical Track Scanner for Magnetic Recording System, Scranton.
IBM Technical Disclosure Bulletin, vol. 27, No. 8, Jan. 1985, pp. 4877-4878, Servowriter Reference Clocks From Shaft Encoder, Farran et al.
IBM Technical Disclosure Bulletin, vol. 23, No. 7B, Dec. 1980, p. 3319, Optical Storage of Data on a Magnetic Medium, Laming et al.
IEEE Transactions of Magnetics, vol. Mag 16, No. 5, Sep. 1980, pp. 631-633, Optical Method of the Head Positioning in Magnetic Disk Systems, Koshino et al.
IBM Technical Disclosure Bulletin, vol. 26, No. 6, Nov. 1983, pp. 2951-2952, Holographically Generated High Resolution Track Servo Pattern for Optical or Capacitive Readout, Werlich et al.
IBM Technical Disclosure Bulletin, vol. 20, No. 10, Mar. 1978, pp. 4108-4109, Optical Servo of Magnetic Recording, Hoagland.
C. Goudal, Abstract of French Application FR2315142, filed Jul. 17, 1975, published Jan. 14, 1977, Derwent Publications Ltd.
IBM Technical Disclosure Bulletin, vol. 27, No. 7A, Dec. 1984, pp. 3994-3995, Optical Recording of Servo Pattern on Magnetic Disks, Aviram et al.

Primary Examiner—Alan Faber
Assistant Examiner—David L. Robertson
Attorney, Agent, or Firm—Stanley H. Mervis

[57] ABSTRACT

Magnetic recording media, and magnetic recording systems using such media, are disclosed which incorporate a light-transmitting optical grating at least substantially coextensive with the magnetic recording area. A second light-transmitting optical grating is associated with the magnetic transducer or read/write head. A moire pattern is produced by light transmitted through both optical gratings, and changes in the moire pattern resulting from changes in the alignment of the optical gratings resulting from movement of the read/write head relative to the media are utilized to provide servo information to keep the magnetic transducer aligned with the magnetic track.

Higher magnetic recording capacities may be obtained using such media and systems, since none of the magnetic recording area is used for servo information.

18 Claims, 3 Drawing Sheets

MAGNETIC RECORDING MEDIA AND SERVO SYSTEMS USING LIGHT-TRANSMITTING OPTICAL GRATINGS

This invention relates to novel magnetic recording media and to methods and apparatus to assure correct locating of information recorded on such magnetic recording media.

BACKGROUND OF THE INVENTION

Magnetic recording media, e.g., floppy disks, rigid disks and tape, record information in "tracks". The number of such tracks per inch is in large part a function of the ability to reliably and reproducibly locate particular tracks and ensure the read/write head accurately follows a track once it has been located. Conventional 5¼" floppy disks usually have 48 or 96 tracks per inch ["tpi"], while 3½" floppy disks have 135 tpi. In contrast, a Winchester disk typically carries 1,000 tpi, but special means must be provided to reliably servo, i.e., control movement of the read/write head and hold it on track. It is very desirable to increase the number of tracks per inch for floppy magnetic media, so that appreciably more information may be stored on the same area.

As the number of tracks per inch increase, the space between tracks decreases, thus requiring a narrower read/write head width as well as more precise tracking to avoid reading/writing on more than the intended track. The read/write head should be centered on the track and not read or write on adjacent tracks. If the magnetic recording medium is a floppy disk, the problem of accurate tracking is made harder by anisotropic dimensional changes, e.g., in the typical polyester support, as a function of temperature and humidity changes, possibly resulting in an "elliptical" track configuration in place of the desired circular track; by vibration of the disk during high speed rotation changing the relative position of the disk to the head or preventing the disk from being truly flat; off-center positioning due to wear of the disk center hole with repeated use; off-center positioning when used in different drives, etc. Indeed, the "on center" positioning of the center hole during manufacture of the disk itself is subject to variation.

The art has recognized the need for higher tpi values, and a number of approaches to the requisite tracking ability have been tried with varying degress of success.

One approach to this problem is disclosed in U.S. Pat. No. 3,130,110 issued Apr. 21, 1964 to Schmidt, wherein it is proposed to cut spiral grooves into part of the disk to provide tracking guidance. Embossed (raised) spiral grooves to provide a guide pattern are disclosed in U.S. Pat. No. 3,772,081 to Franer.

Japanese Kokai (Published Patent Application) No. 59-146444 published Aug. 22, 1984, proposes to leave outer and inner areas of a magnetic disk uncoated with magnetic material, and to use a light transmission type optical sensor to detect the magnetic area edge and effect alignment to facilitate track position following.

U.S. Pat. Nos. 4,516,177 issued May 7, 1985 to Moon, et al.,4,396,959 issued Aug. 2, 1983 to Harrison, et al., and 4,419,701, issued Dec. 6, 1983 to Harrison, et al. (all assigned to Quantum Corporation), propose to use an optical encoder to provide "coarse" servo control of the read/write head to position the head close to a track, the disk having factory pre-recorded thereon radial sector bursts to provide centerline correction information to provide fine correction and keep the read/write head in centerline alignment with the desired track. The optical encoder (see, e.g., FIG. 5 of Harrison, et al., U.S. Pat. No. 4,396,959) comprises a light source, a scale having a series of equally closely spaced microscopic radial lines, and an integrated circuit photosensitive reticle-masked array, which in combination produce light and dark polyphase (quadrature) patterns used to generate a servo waveform. The optical encoder is completely separate from the magnetic disk.

IBM Technical Disclosure Bulletin, Vo. 27, No. 8, January 1985, pp. 4877–4878, entitled "Servowriter Reference Clocks from Shaft Encoder", discloses a moire fringe optical encoder mounted directly to the main drive spindle close to, but separate from, the magnetic disk.

U.S. Pat. No. 3,633,038 issued Jan. 4, 1972 to Falk discloses an optical system for positioning a transducer in registration with a track on a magnetic tape or disk. A pair of optical masks having alternating opaque and transmissive lines are positioned so that light passing through both masks strikes a pair of photocells. One optical mask is mounted on the transducer carriage so as to move across the second optical mask as the transducer is moved laterally across the magnetic tracks. The light striking the photocells generates a signal which may be used to identify the track position of the transducer. Again, the optical masks are separate from the magnetic media.

U.S. Pat. Nos. 4,558,383 issued Dec. 10, 1985 to Johnson and 4,587,579 issued May 6, 1986 to Cocke, et al. disclose magnetic media bearing markings which can be detected optically by reflection to provide a servo signal. U.S. Pat. No. 4,570,191 issued Feb. 11, 1986 to DiStefano, et al. discloses optical sensors suitable for mounting in the slider housing the read/write head, the optical sensor being used to detect such reflected optical servo tracks or indica positioned on the magnetic media, as contemplated, inter alia, by said Johnson and Cocke, et al. patents.

IBM Technical Disclosure Bulletin, Vol. 16, No. 9, February 1974, p. 3020, discloses an "Optical Servo Technique Using Moire Fringes", wherein a grating of opaque or non-reflecting concentric circles with equal reflecting spaces is formed on the magnetic storage hard disk (reducing the area available for magnetic recording), and a grating of parallel opaque or non-reflecting lines of the same dimensions is provided on a transparent member positioned on the slider carrying the read/write head. Light from a light-emitting diode [LED], also positioned on the slider (or arm) carrying the read/write head, is reflected off the disk grating to form a moire pattern with the slider grating if the slider is skewed by a few degrees with respect to the disk. A sinusoidal optical density variation produced by changes in the moire pattern can be detected by photodiodes, and phase changes in the sinusoidal output can be interpolated by suitable electronic circuitry to provide directional information to position the head over the desired track.

Other approaches to solving the problem include providing magnetically recorded, spaced servo track information, e.g., the so-called "embedded servo". The servo signals typically divide the disk into sectors, with the result that recording is not on a continuous track and servo information is not continuous. In addition, the magnetic area available for recording information is reduced by the area dedicated to the magnetic servo information. Yet another approach is disclosed in PCT Published Application WO No. 85/02933 published July 4, 1985, wherein it is proposed to provide servo information by the use of optical recording tracks positioned between magnetic tracks to provide optical guidelines readable by reflected light.

Most, if not all; of the prior systems noted above suffer from the disadvantage of reducing the magnetic surface area available for magnetic recording. In addition, the information signal used for servo purposes is usually discontinuous, resulting in intermittent servo changes.

SUMMARY OF THE INVENTION

The present invention provides magnetic recording media adapted to provide continuous servo information using a light-transmissive optical grating in combination with a continuous magnetic layer, without reduction in the area of the magnetic coating being available for magnetic recording due to the presence of the optical grating. Apparatus and systems using this new media also are provided.

The novel magnetic recording media of this invention are light-transmissive and include floppy disks, rigid disks, and tapes.

In accordance with this invention, the magnetic recording media include a light-transmitting optical grating adapted to provide a moire pattern in combination with a second or reference light-transmitting optical grating associated with the read/write head. Variations in the moire pattern resulting from varying the relative positions of the optical gratings from a predetermined or "normal" alignment magnify the non-alignment and are used to provide positioning information to control servo means to keep the read/write head in the desired alignment with a particular track. The optical grating covers an area at least substantially coextensive with the magnetic recording area of the media, and may extend outside of the magnetic recording area.

The use of a light-transmitting optical grating makes possible a double-sided magnetic disk using only one such grating (in the disk) and a single light source. By contrast, the prior art Hart reflection moire system is limited to a single-sided disk unless a second optical grating and a second light source are used.

Further, the use of the moire servo system of this invention avoids the expensive and time-consuming factory recording of magnetic servo information on each disk.

DETAILED DESCRIPTION OF THE INVENTION

The generation of moire patterns formed by two optical gratings of the same or slightly different pitch is a well known phenomenon. Slight changes in the relative positions of the two gratings are optically amplified or magnified by the resulting relatively larger scale changes in the moire pattern. This invention utilizes this phenomenon to provide novel magnetic recording media incorporating light-transmissive optical gratings adapted to generate moire fringes. Means also are provided for detecting changes in the moire patterns formed by light transmitted through the optical grating in the magnetic recording medium and through a second or reference optical grating mounted within the apparatus, and to use signals generated by photocells indicative of said moire changes to control servo means to adjust the relative position of a read/write head or magnetic transducer with respect to the media in response to the detected changes in the moire pattern.

The optical grating incorporated in the magnetic recording media of this invention may be any light-transmissive optical grating adapted to provide a moire pattern in combination with a second optical grating of the same or of a different type. In some preferred embodiments, the optical gratings differ in pitch, i.e., in the number of lines per inch. One example of a suitable optical grating is a lenticulated layer comprising lines of lenticules (lenticular lenses) providing the desired number of lines. In the preferred embodiments, the optical gratings comprise opaque lines spaced apart by transparent lines preferably of equal width; such optical gratings are sometimes referred to as a "Ronchi" grating. A Ronchi optical grating may be used as the reference optical grating in combination with either type optical grating in the magnetic recording media.

The invention will be further described in conjunction with the drawings wherein.

Figure 6:
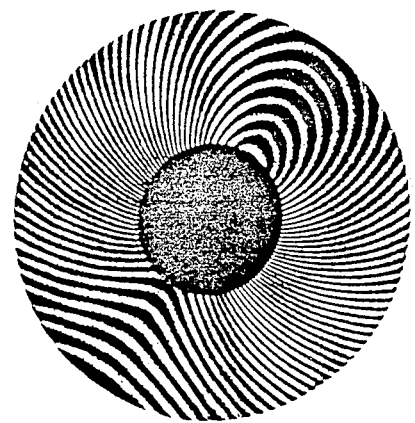
Figure 7:
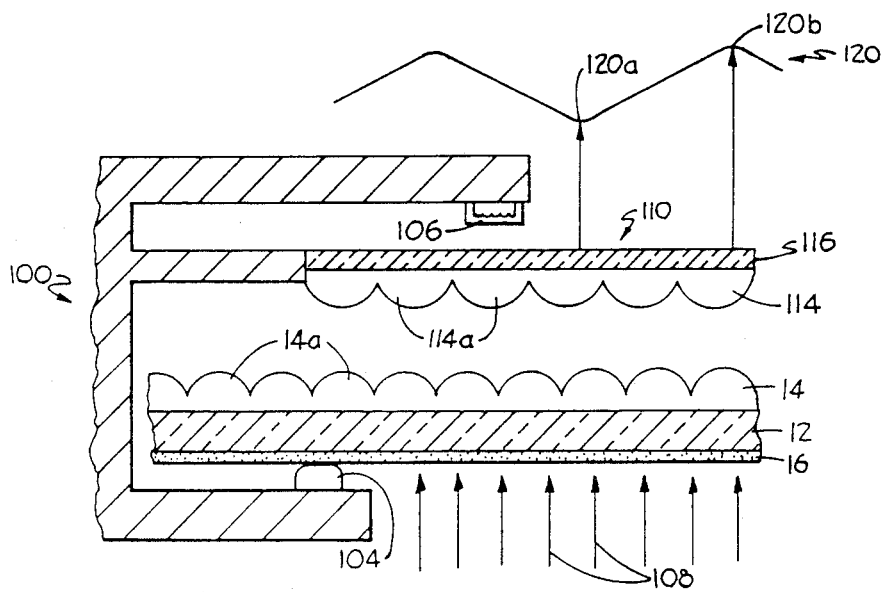
Figure 8:
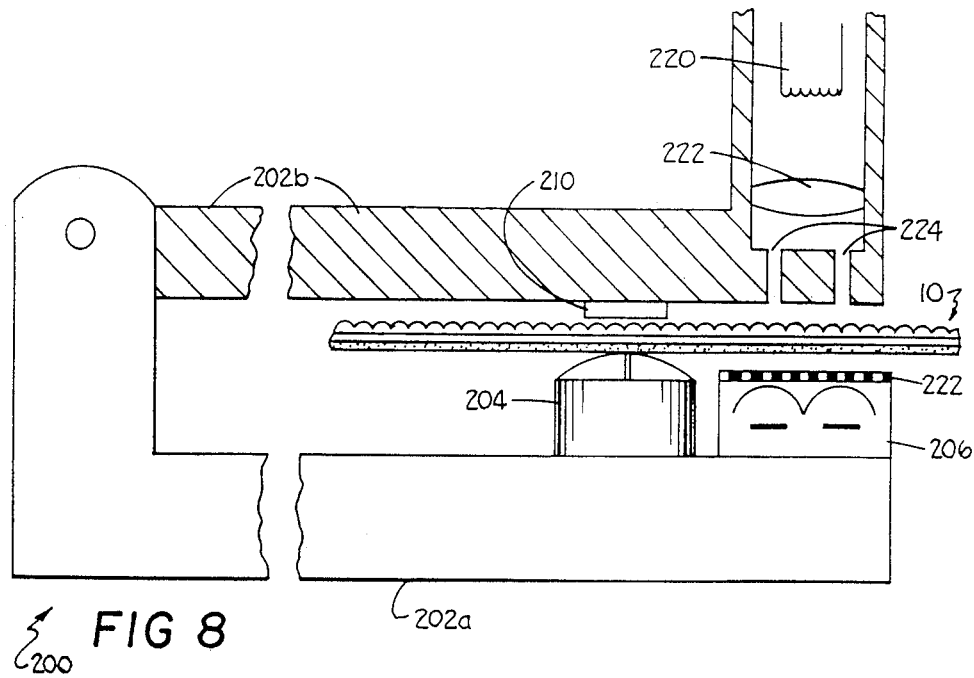
Figure 9:
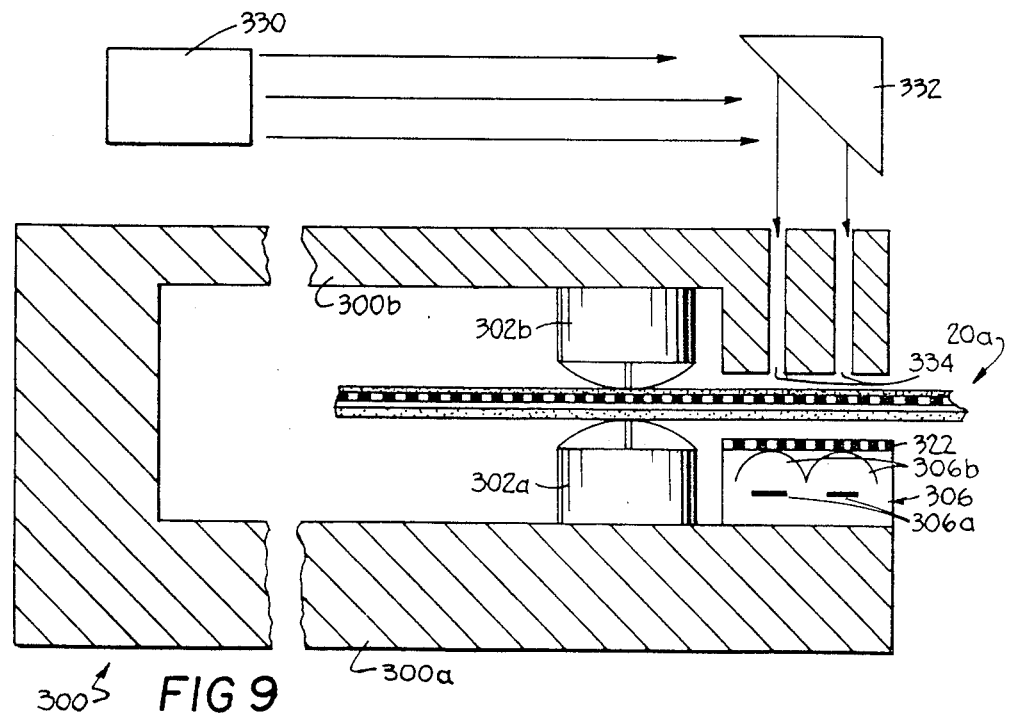

FIG. 6 reproduces a moire pattern illustrative of pattern changes due to non-alignment and thus useful in the practice of this invention;

FIG. 7 is a cross-sectional fragmentary view of embodiment of the apparatus of this invention, shown in association with a magnetic recording medium incorporating a lenticular optical grating;

FIG. 8 is a cross-sectional fragmentary view of another embodiment of the apparatus of this invention, shown in association with a magnetic recording medium incorporating a Ronchi optical grating; and FIG. 9 is a cross-sectional fragmentary view of yet another embodiment of the apparatus of this invention shown in association with a magnetic recording medium incorporating a Ronchi optical grating.

As noted above, the magnetic recording media of this invention are light-transmitting. Accordingly, the media utilize a transparent support, either rigid or flexible, and the coatings (layers) carried thereon are light-transmissive of a predetermined wavelength or wavelength range capable of being selectively detected by a photodetector. The light transmitted by the magnetic recording medium may be visible light or invisible light, and in the preferred embodiments is infrared light. A variety of light sources may be used, including incandescent lamps, light-emitting diodes (LED) and laser diodes. Light transmitted through the magnetic recording medium and the reference optical grating varies in intensity as a function of the phase alignment of the optical gratings. The transmitted light is detected by suitable photocells or photodetectors which convert the light intensity into electrical signals representative thereof. The photodetectors are positioned so that they detect the maximum and minimum light intensities when the optical gratings are properly aligned, so that the electrical signals from one is out of phase with the other by, e.g., 180° or 90°. These phase displaced signals are compared, and changes in the differences therein are used to control suitable servo means to align the magnetic transducer with the intended magnetic track and to keep the transducer so aligned.

The read/write head and the photodetectors should be adjacent each other to minimize changes in the magnetic and optical axes due to thermal changes during use. This arrangement also permits the head access window in the disk cassette or cartridge to be small.

It will be understood that by "opaque" it is meant that the opaque lines forming the Ronchi optical grating should exhibit low transmission of the wavelength range of the visible or invisible light intended to be transmitted through the magnetic recording medium, including the optical grating, to form the desired moire pattern. The more opaque the lines are to the wavelength range of the utilized light, the higher the signal to noise ratio will be in the moire pattern. In general, a delta of about 1.5 to 2.0 in maximum and minimum transmission densities of the optical grating is suitable. Complete opaqueness is not required if the signal to noise ratio of the transmitted light, i.e., the ratio of the light transmitted through the non-opaque areas compared with the light transmitted, if any, through the opaque areas, is sufficient for the detector system to provide the desired signals. Higher signal-to-noise ratios permit the use of lower wattage light sources. It is usually advantageous to select a narrow bandwidth of light as the transmitted light, with the detector designed to selectively accept a somewhat wider bandwidth, thereby assuring that minor variations in the light source will be accomodated. In the preferred embodiments using a Ronchi optical grating, the preferred light source is a LED or laser diode emitting infrared light of about 850 nm.

It will be understood that in describing the magnetic recording media as having a "transparent" support, and the layers carried by said support as being "light-transmitting" or "light transmissive", said terms are used with respect to the predetermined wavelength(s) of light to which the selected photodetectors respond. Thus, the magnetic recording layer may comprise any of the conventional magnetic recording particles, such as gamma ferric oxide or barium ferrite, and accordingly will appear to be "colored" even though it is in fact substantially transparent to selected wavelengths.

For convenience in the following more detailed description of the invention, it will be assumed that the magnetic recording medium is a floppy disk, and the optical gratings have a circular pattern. (As noted above, the invention also is applicable to rigid disks and to tapes.)

Figure 1:
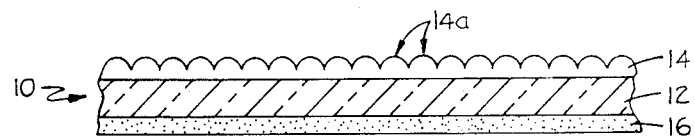
FIG. 1 is a cross-sectional, exaggerated diagram of a single-sided, light-transmitting magnetic recording medium incorporating a lenticular optical grating.
Figure 2:
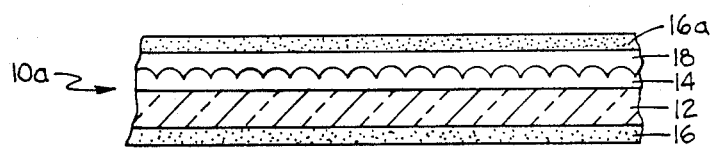
FIG. 2 is a cross-sectional, exaggerated diagram of a double-sided, light-transmitting magnetic recording medium incorporating a lenticular optical grating.

Referring to FIG. 1, a single-sided magnetic disk 10 comprises a transparent support 12 carrying on one surface a layer 16 of magnetic recording particles and on the other surface an optical grating 14 comprising lines of lenticules 14a. As shown in FIG. 2, the single-sided disk 10 may be converted to a double-sided disk 10a by overcoating the lenticular layer 12 with a transparent polymer having a different refractive index to provide a smooth surface on which a second layer 16a of magnetic recording particles is coated.

The formation of lenticular layers per se, e.g., by molding or embossing techniques, is not a part of this invention; since such techniques are well known in the art, a detailed description of the preparation of lenticular optical gratings is not necessary. One particularly useful technique, however, is to electron beam cross-link a polymer coating while it is held against a suitable "negative" mold of the desired lenticular pattern. It will be understood, of course, that the focal length of the lenticular lenses is selected in accordance with the geometric distances between the lenticular layers in the particular recording system, and accordingly the focal length determination is a matter of routine calculation and experimentation.

In the preferred embodiments of this invention, as noted above and as shown in FIGS. 3 and 4, the optical grating is a Ronchi comprises opaque lines spaced apart by clear lines of the same width. Thus, the single-sided magnetic disk shown in FIG. 3 comprises a transparent support 12 carrying on one surface a layer 16 of magnetic recording particles, while the other surface carried an optical grating 22 comprising opaque lines 22a spaced by clear lines 22b of equal width. By coating a second layer 16a of magnetic particles over the optical grating 22, the single-sided magnetic disk 20 of FIG. 3 may be converted into the double-sided magnetic disk 20a shown in FIG. 4.

The opaque lines 22a may be formed by any method suitable for the desired number of lines per inch. As examples of suitable methods, mention may be made of photolithographic techniques and photographic imaging techniques using photothermal materials, silver halide, silver transfer, photoresist, etc, as well as such techniques as etching and vacuum deposition. The selection of a particular method of forming the desired opaque lines will be influenced by such factors as process economics, the number of lines per inch, and the desired "opacity" or transmission densities of the opaque and clear lines of the desired optical grating for a given embodiment. Such techniques for forming Ronchi gratings are per se well known and need not be described in detail here. It will be understood that the Ronchi grating should exhibit a smooth surface upon which a magnetic layer may be coated; if the surface is not smooth or is in fact irregular, e.g., as in a photoresist, a suitable polymer may be coated over it to fill in the spaces and provide the desired smooth surface.

Figure 5:
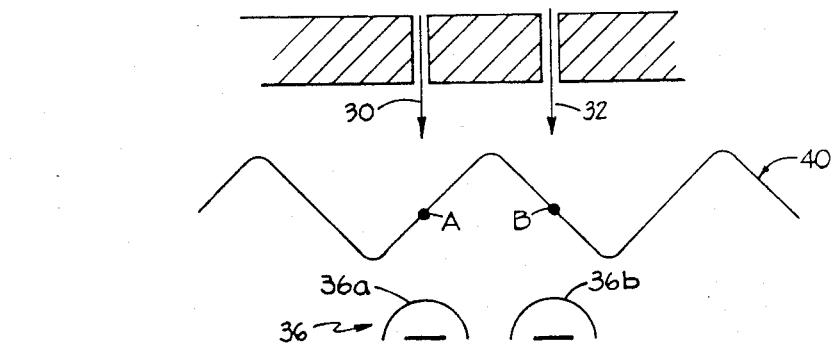
FIG. 5 is a representation of a sinusoidal light intensity curve of a moire pattern produced in accordance with a preferred embodiment of this invention, the curve being superposed on a fragmentary cross-sectional view of a pinhole and light-detector assembly used to generate the curve as a function of variations in the intensity of the light transmitted through the pair of optical gratings.

The optical grating associated with the read/write head preferably differs from the optical grating incorporated in the magnetic disk by ±n lines. In the preferred embodiments, n=8 (e.g., the optical grating in the disk has 548 lines, while the reference optical grating has 540 lines) and the resulting moire sinusoidal pattern has 8 peaks (opaque/clear line pairs) per inch giving 180° sensing of the phase changes using a pinhole and detector axial spacing of 0.0625 inch between the detectors. The high efficiency of the optical amplification of relative movement is illustrated by the fact that where n=8 a relative lateral movement between the two optical gratings of 0.0018 inch will effect a movement in the moire pattern of 0.125 inch. The sine wave sinusoidal pattern obtained wherein n=8 is illustrated in FIG. 5 superposed on a pinhole and light detector assembly, wherein collimated light beams 30 and 32 are positioned in alignment with two-element photodetector (photodiode) 36. If one calibrates detectors 36a and 36b for light intensities corresponding to the half-amplitude or midpoints "A" and "B" between the peaks and troughs of the sinusoidal curve (corresponding to the maximum and minimum light transmissions, one can "zero out" the two light intensities, and calibrate the system so as to use the magnitude of the departure from "zero" to indicate how the magnetic transducer should be moved to keep it aligned with the track. If n=4, the moire pattern will exhibit 4 peaks (opaque/clear line pairs) per inch, and sensing will be phase shifted by 90°. It will be understood that one also may servo from different phase shifts in the light intensities, e.g., corresponding to the peaks and troughs of the light pattern produced by the photodetectors.

FIG. 6 reproduces a moire pattern obtained by superposing an optical grating of 548 lines (circles) per inch over a similar grating of 540 lines, with the centers of the optical gratings off center with respect to each other. This moire pattern will vary as a function of the amount of non-alignment of the geometric centers of the circular optical gratings. While the use of straight lines instead of circles in the optical gratings (e.g., for use in magnetic tape) will produce different moire patterns, such moire patterns may be similarly used to provide servo information and control.

In FIG. 7 there is illustrated a disk carriage assembly 100 including a read/write magnetic transducer or head 104 and a detector 106. A floppy disk 10 (see FIG. 1) is positioned in operative relationship with the read/write head 104, with the layers thereof shown in exaggerated scale to facilitate illustration of the operation of the lenticular optical grating 14. Associated with the detector 106 is a reference lenticular optical grating 110 comprising a transparent support 116 and a lenticular layer 114. The reference optical grating 110 is shown in exaggerated scale similar to the floppy disk 10. For illustrative purposes, the lenticular optical grating 14 may be assumed to comprise 544 lenses per inch, and the reference lenticular optical grating 114 has 540 lenses per inch (i.e., "n"=4). A light source (not shown) provides collimated light 108 which is transmitted by the magnetic coating 16 and the transparent support 10 and focussed by lenses 14a onto lenses 114a of the reference grating 114. Lenses 114a in turn focus the transmitted light onto the detector as a low intensity or high intensity light area as a function of the alignment or non-alignment of lenses 14a and 114a. Conventional means converts the output from the detector 106 into a sine wave 120, with the trough 120a corresponding to said low light intensity area and the peak 120b corresponding to said high light intensity area. The sensing illustrated in FIG. 7 where n=4 may be referred to as 90° sensing.

FIG. 8 illustrates another embodiment of the invention wherein different types of optical gratings are used in the floppy disk and in the detector. As shown, a disk carriage assembly 200 comprises an arm or slider 202a carrying a read/write head 204 and a two element photodetector 206 including a Ronchi optical grating 222. The other arm 202b carries a pressure pad 210 to ensure proper contact of the read/write head 204 with the floppy disk 10. The arm 202b also carries a light source 220, light from which passes through a lens 222 and pinholes or slits 224, and then through the floppy disk 10 (including the optical grating 14) onto the lined Ronchi optical grating 222 associated with the photodetector 206. As described above, alignment changes between the optical gratings responsive to movement of the head 204 (slider 202a) produce changes in the moire pattern and are converted by conventional means into signals used to control servo means (not shown) to appropriately move the read/write head to keep it in alignment with the desired magnetic track.

FIG. 9 illustrates another embodiment of the apparatus of this invention adapted for use with double-sided floppy disks. A disk carriage assembly 300 shown associated with a floppy disk 20a (see FIG. 4) comprises an arm or slider 300a carrying a read/write head 302a for the side 0 magnetic coating 16. The arm 300a also carries a dual element photodetector 306 associated with a reference lined optical grating 322 having 540 lines per inch. The other arm or slider 300b carries a read/write head 302b for the side 1 magnetic coating 16a. An IR laser diode 330 provides a source of collimated infrared light which is reflected by a reflector 332 through a pair of slits or pinholes 334 in the arm 300b. The thus-provided infrared light passes through the floppy disk 20a, including a Ronchi optical grating 22 having 548 lines per inch (i.e., "n"=8). The photodetector 306 includes a filter 306b adapted to pass substantially only infrared light of a predetermined wavelength or wavelength range to the sensors 306a. As previously described, electrical signals generated by the photodetector 306 are used to servo the read/write head 302a or 302b, as appropriate, with respect to the floppy disk 20a.

It will be understood that the number of lines in the optical gratings may be fewer than the number of magnetic tracks per inch. This relationship is possible because the photodetector (e.g., 106, 206, 306) is collecting and averaging information from a plurality of "optical tracks", e.g., 10, at the same time the read/write head is aligned with a single magnetic track. This averaging also minimizes the significance of any minor defects in the optical grating, e.g., a local variation in the thickness or opacity of an opaque line.

Suitable magnetic recording particles include ferric oxides, (e.g., gamma ferric oxide and cobalt-doped ferric oxide), metal particles, and hexagonal ferrites (e.g., hexagonal barium ferrite). The use of barium ferrite is preferred since its use maximizes the recording density. Suitable magnetic recording layers may have a thickness of about 0.5 to 2 microns, and may be even thicker where barium ferrite is used. It is common practice to include a conductive material such as carbon black in magnetic coatings to modify the electrical properties of the floppy disk. If the presence of carbon black reduces to too low a level the transmissivity of the floppy disk to light of the desired wavelength, the carbon black may be used in lower concentrations or replaced by a colorless conductive material, e.g., cuprous iodide in a separate layer adjacent the transparent support. Alternatively, a wavelength transmitted by carbon black may be used with an appropriate photodetector.

Where it is desired to have a "rigid" disk, the transparent support may be composed of a material such as polycarbonate of appropriate thickness.

The photodetectors are conventional in nature. Similarly, conventional servo means (not shown but well known in the art) may be used, and, e.g., may include a stepper motor or a linear actuator, the latter being preferred.

The use of Ronchi gratings is preferred to the use of lenticular optical gratings, as the Ronchi gratings exhibit a greater tolerance of changes in the physical spacing between gratings during use. As will be apparent from FIG. 7, changes in the physical spacing between the two lenticular gratings and consequent changes in the focussing of the transmitted light should be kept to a minimum to avoid unintended signal variations.

In a particularly useful embodiment, the Ronchi optical gratings are formed by silver diffusion transfer techniques. A suitable film structure for this purpose comprises a transparent polyester base (having a thickness suitable for use as the support for a floppy disk) carrying, in sequence, a silver transfer image-receiving layer composed of silver precipitating nuclei, a protective layer, a release layer and a silver halide emulsion layer. After exposure to a master negative image of the desired Ronchi pattern, a viscous processing fluid is distributed between the exposed silver halide emulsion and a cover sheet. After a suitable processing period in which unexposed silver halide is dissolved and transferred to the image-receiving layer to form a positive silver transfer image constituting the desired Ronchi pattern, the cover sheet is stripped off together with the layer of processing fluid and the layers (silver halide emulsion, etc.) above the release coat. The protective layer may serve as a layer upon which a magnetic coating may be applied, provided the release coat has been removed or its presence does not adversely affect adhesion to the magnetic or other coating(s). Silver diffusion transfer films of this type are known in the art and no further description is necessary.

Figure 3:
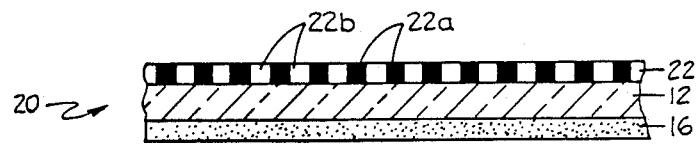
FIG. 3 is a cross-sectional, exaggerated diagram of single-sided, light-transmitting magnetic recording medium incorporating an optical grating comprising opaque lines.
Figure 4:
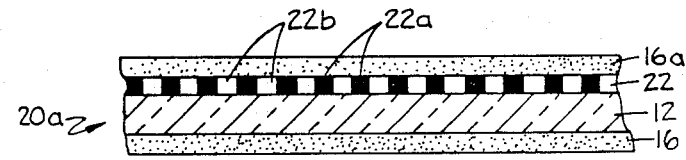
FIG. 4 is a cross-sectional, exaggerated diagram of a double-sided, light-transmitting magnetic recording medium incorporating an optical grating comprising opaque lines.

The reference Ronchi gratings may be formed by photographic exposure and development of a high contrast conventional silver halide film, such as Kodalith film available from Eastman Kodak Co. Such Ronchi gratings may be used as a component of the magnetic media provided the magnetic coating may be satisfactorily adhered to the silver-containing gelatin layer or to a layer coated over it.

Where appropriate, a protective coating may be applied to prevent excessive wear of the optical grating, e.g., lenticular grating 14 of FIG. 1 or Ronchi grating 22 of FIG. 3.

A collimated light source should be used where the optical grating is lenticular. A point source of light is preferred where the optical gratings are Ronchi gratings.

The optical grating in the magnetic disk may be used to form a moire pattern suitable to center the magnetic disk hub relative to the optical grating on the disk. The photographic master image used to form the Ronchi lined optical grating also may include centering markings to facilitate accurate location of the center hole.

In a particularly useful embodiment, the optical grating does not extend to the edge of the disk or tape. Although the magnetic layer covers the whole surface, only a portion is used for magnetic recording. The optical grating preferably extends beyond the magnetic recording area, and a test or reference line may be printed in "clear" area between the disk edge and the optical grating. By comparing the point at which the detector first sees the moire (from the optical grating or from the reference line in the clear area) and the axial position when the read/write head first sees a magnetic track, one may calculate any offset needed to calibrate the system for correct functioning with different disk drives.

As noted above, this invention facilitates fabrication of very high density magnetic recording media. As an example, by using barium ferrite at a linear density of 40 kfci and 540 tpi, and rotating the disk at 1200 rpm, a 3½ inch floppy disk with a recording capacity of 10 g megabytes per side may be obtained. Individual magnetic track width in this instance is approximately 0.0018 inch, with a guard band of the same width (the magnetic track may, however, be wider than the guard band).

It will be seen from the above description that this invention provides magnetic recording media adapted to record substantially more magnetic information in a given magnetic area (i.e., more tpi) while making available substantially continuous servo information by providing an optical grating at least substantially coextensive with the area upon which magnetic information is to be recorded.

The magnetic coating may be applied before or after the optical grating is provided on the transparent support, provided that components used in the second coating, e.g., organic solvents, do not adversely affect the first coating.

While the invention has been described in detail with respect to specific embodiments thereof, it will be apparent to one skilled in the art that various changes and modifications can be made thereto without departing from the spirit and scope thereof.

What is claimed is:

1. A system for magnetically reading and/or writing data in one of a plurality of tracks on a magnetic recording medium, said system comprising, in combination:

a light-transmitting magnetic recording medium comprising a transparent support, a continuous light-transmitting layer of magnetic recording material carried on one or both sides of said transparent support, said transparent support also carrying a light-transmitting optical grating at least substantially coextensive with the area upon which magnetic tracks are recorded;

a read/write head;

means for positioning said magnetic recording medium in read/write relationship with said read/write head and for moving said magnetic recording medium in relation to said read/write head to generate read/write signals;

photodetector means adapted to provide an electrical signal as a function of light incident thereon, said photodetector means including a reference light-transmitting optical grating adapted, in combination with said optical grating in said magnetic recording medium, to provide a moire pattern detectable by said photodetector means, said photodetector means being adapted to provide electrical signals indicative of the light incident thereon;

a light source, said light source positioned to project light through said magnetic recording medium to said photodetector means;

means for comparing changes in said electrical signals as a function of changes in said moire pattern in response to relative movement of said optical gratings; and servo means to change the position of said read/write head in response to said changes in said moire pattern to maintain said read/write head in alignment with a predetermined magnetic track.

2. A system as defined in claim 1 wherein said light source provides infrared light of a predetermined wavelength.

3. A system as defined in claim 2 wherein said infrared light has a wavelength of about 850 nm.

4. A system as defined in claim 2 wherein said photodetector means are adapted to provide 90° phase shift sensing of said moire pattern.

5. A system as defined in claim 2 wherein said photodetector means are adapted to provide 180° phase shift sensing of said moire pattern.

6. A system as defined in claim 2 wherein said light-transmitting optical grating in said magnetic recording medium is a lenticular optical grating.

7. A system as defined in claim 2 wherein said light-transmitting optical grating in said magnetic recording medium is a Ronchi optical grating.

8. A system as defined in claim 2 wherein said reference optical grating is a Ronchi optical grating.

9. A system as defined in claim 2 wherein said photodetector means and said read/write head are carried on a slider in close proximity to each other.

10. A system as defined in claim 2 wherein said magnetic recording medium is a disk, and said light-transmitting optical grating comprises concentric opaque circles.

11. Apparatus for use with a light-transmitting magnetic recording medium of the type comprising a transparent support, a continuous light-transmitting layer of magnetic recording material carried on one or both sides of said transparent support, said transparent support also carrying a light-transmitting optical grating at least substantially coextensive with the area upon which magnetic tracks are recorded, said apparatus comprising:

a read/write head;

means for positioning a magnetic recording medium of said type in read/write relationship with said read/write head and for moving said magnetic recording medium in relation to said read/write head to generate read/write signals;

photodetector means adapted to provide an electrical signal as a function of light incident thereon, said photodetector means including a reference light-transmitting optical grating adapted, in combination with the optical grating in said magnetic recording medium, to provide a pattern detectable by said photodetector means, said photodetector means being adapted to provide electrical signals indicative of the light incident thereon;

a light source, said light source positioned to project light through said magnetic recording medium to said photodetector means;

means for comparing changes in said electrical signals as a function of changes in said pattern in response to relative movement of said optical gratings with respect to the optical grating in the magnetic recording medium; and servo means to change the position of said read/write head in response to said changes in said pattern to maintain said read/write head in alignment with a selected magnetic track.

12. Apparatus as defined in claim 11 wherein said light source provides infrared light of a predetermined wavelength.

13. Apparatus as defined in claim 11 wherein said reference optical grating is a Ronchi optical grating.

14. Apparatus as defined in claim 11 wherein said photodetector means and said read/write head are carried on a slider in close proximity to each other.

15. The method of positioning a read/write head adjacent a magnetic recording medium for reading or writing data on a selected one of a plurality of tracks on said magnetic recording medium, said method comprising the steps of:

positioning a light-transmitting magnetic recording medium in read/write relationship with a read/write head, said light-transmitting magnetic recording medium comprising a transparent support, a continuous light-transmitting layer of magnetic recording material carried on one or both sides of said transparent support, said transparent support also carrying a light-transmitting optical grating at least substantially coextensive with the area upon which magnetic tracks are recorded;

moving said magnetic recording medium in relation to said read/write head to generate read/write signals;

projecting light through said magnetic recording medium;

detecting the light transmitted through said magnetic recording means by photodetector means adapted to provide an electrical signal as a function of light incident thereon, said photodetector means including a reference light-transmitting optical grating adapted, in combination with said optical grating in said magnetic recording medium, to provide a pattern detectable by said photodetector means, said photodetector means being adapted to provide electrical signals indicative of the light incident thereon;

and changing the position of said read/write head in response to said electrical signals to maintain said read/write head in alignment with a selected magnetic track.

16. The method defined in claim 15 wherein said light is infrared light.

17. The method defined in claim 16 wherein each of said optical gratings is a Ronchi optical grating.

18. The method defined in claim 17 wherein said pattern is a moire pattern.

* * * * *